United States Patent [19]

Long et al.

[11] Patent Number: 5,253,321
[45] Date of Patent: Oct. 12, 1993

[54] MEANS FOR INSERTING FIBER OPTIC PROBES INTO PRESSURIZED VESSELS

[75] Inventors: Stephen L. Long; David L. Gebert; Frank M. Rexach; Gregory A. Winslow, all of Houston; Dale F. Brost, Sugarland, all of Tex.

[73] Assignee: Texaco Inc., White Plains, N.Y.

[21] Appl. No.: 884,820

[22] Filed: May 18, 1992

[51] Int. Cl.⁵ ............................................. G02B 6/44
[52] U.S. Cl. .................................................. 385/138
[58] Field of Search .................. 385/12, 138; 356/51, 356/70, 73.1; 250/227.23, 227.25

[56] References Cited

U.S. PATENT DOCUMENTS

| | | | |
|---|---|---|---|
| 4,444,516 | 4/1984 | Dostoomian et al. | 385/138 |
| 4,544,233 | 10/1985 | Iwamoto et al. | 385/138 |
| 4,759,601 | 7/1988 | Knutsen et al. | 385/138 |
| 4,909,588 | 3/1990 | Harner et al. | 385/12 |

FOREIGN PATENT DOCUMENTS 478460A 4/1992 European Pat. Off. ............ 385/138

Primary Examiner—Frank Gonzalez
Attorney, Agent, or Firm—James L. Bailey; Jack H. Park; Russell J. Egan

[57] ABSTRACT

A fiber optic probe mounting assembly has an inner assembly which receives an optical fiber cable and holds it in a sealed alignment. The inner assembly is sealingly received in an outer assembly which is provided with means for attachment to a pressure vessel.

17 Claims, 3 Drawing Sheets

MEANS FOR INSERTING FIBER OPTIC PROBES INTO PRESSURIZED VESSELS

BACKGROUND OF THE INVENTION

1. The Field of the Invention

The present invention relates to a device for mounting a fiber optic probe into a pressurized vessel.

2. Prior Art

The present invention finds particular use in inserting a fiber optic probe into a pressurized vessel, such as a pipeline, with the probe then being used to conduct light into fluid within the vessel and conduct reflected light to detector means for measurement of a characteristic of the fluid passing through the vessel. The problems associated with mounting of an optical fiber in such an environment are many, including both the pressures encountered and the interaction with the chemical materials which may have a deleterious effect on the fiber. The present invention overcomes many of the problems associated with the prior art by providing adaptability in insertion depth, ability to readily change the optical fiber, and redundancy in sealing.

SUMMARY OF THE INVENTION

The present invention is a device for mounting an optical fiber probe in a pressure vessel and has an inner assembly which secures the optical fiber and an outer assembly which receives the inner assembly therein and mounts the entire assembly on the pressure vessel. The inner assembly is adjustably positioned within the outer assembly to control the depth of insertion of the probe into the pressure vessel.

BRIEF DESCRIPTION OF THE DRAWINGS

The present invention will now be described, by way of example, with reference to the accompanying drawings in which.

DETAIL DESCRIPTION OF THE PREFERRED EMBODIMENT

Figure 1:
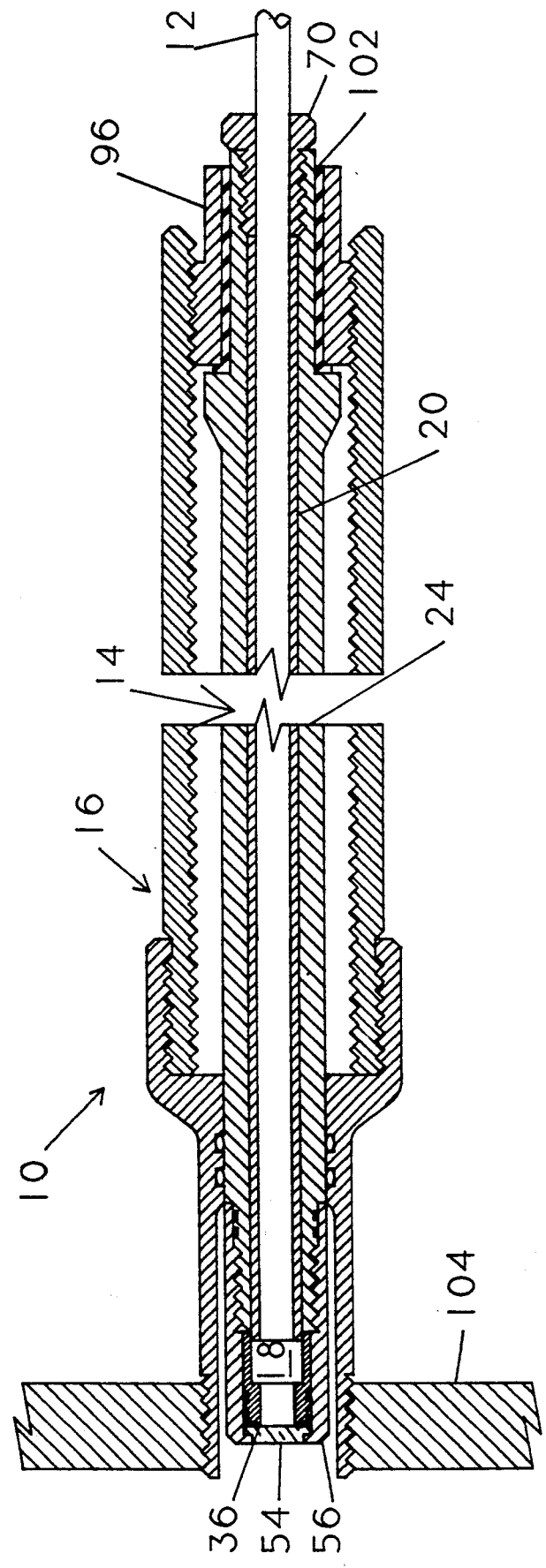
FIG. 1 is a longitudinal section through the device according the present.
Figure 2:
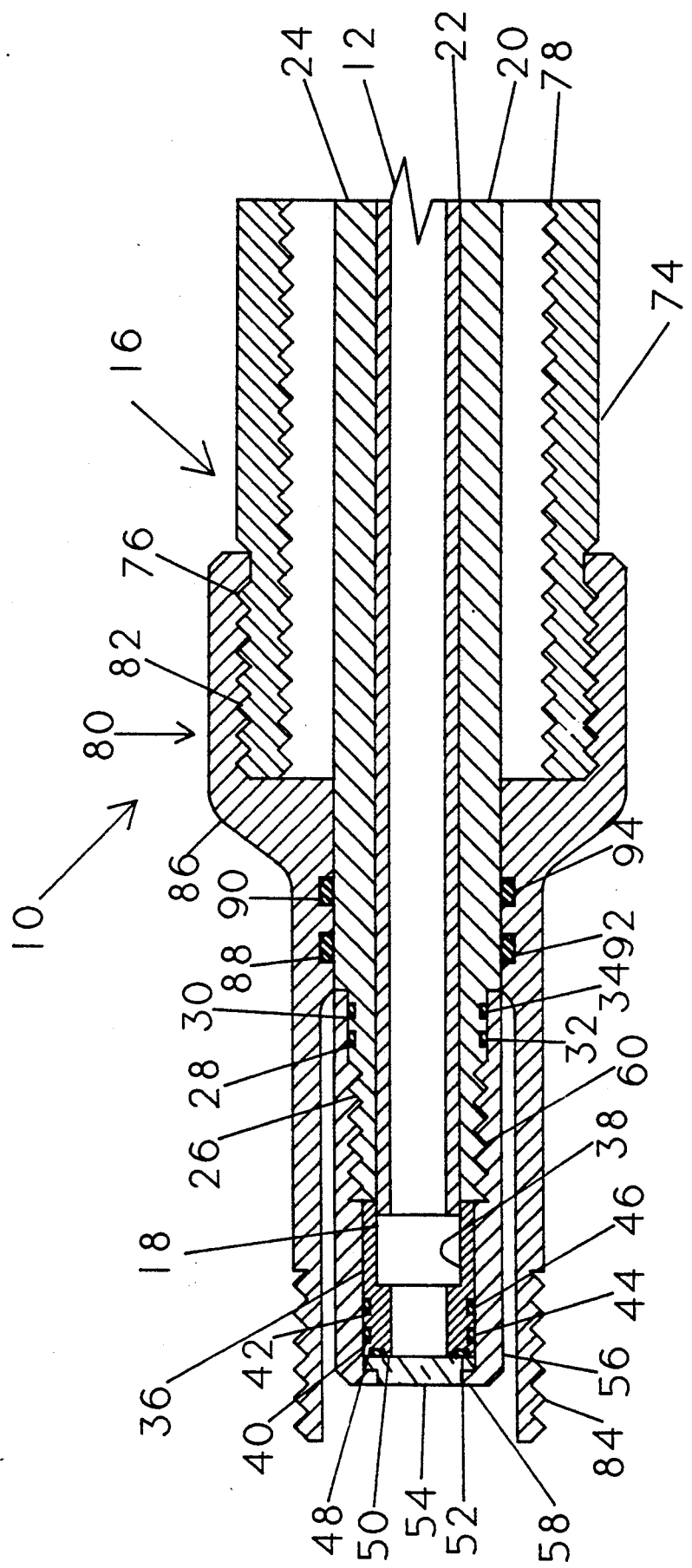
FIG. 2 is an enlarged detail of the nose portion of the device shown in FIG. 1.
Figure 3:
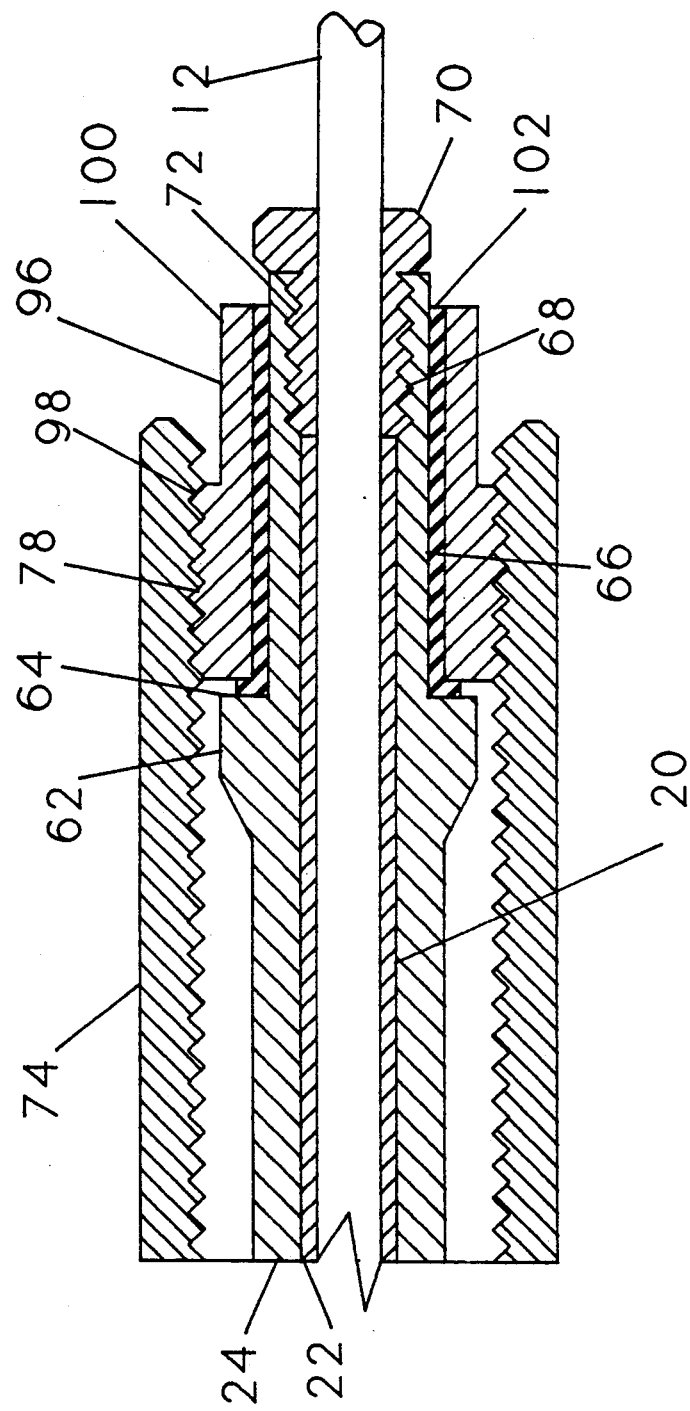
FIG. 3 is enlarged detail of the tail portion of the device shown in FIG. 1.

A foreshortened version of the subject mounting device 10 is shown in FIG. 1 and generally comprises the optical fiber cable 12, the inner fiber mounting assembly 14 and the outer probe assembly 16. The fiber cable 12 is of any well known configuration and includes one of more individual optical fibers (not shown) formed from glass or plastics materials and encased within a jacket with a retaining ring 18 secured near the free end of the cable in order to assure its proper positioning.

The inner mounting assembly 14 includes a fiber optic retaining rod 20, which is an in elongated member having a C-shaped section. This configuration enables inserting a fiber optic cable transversely therein thereby facilitating exchange of the cable. The rod 20 and fiber 12 are received in an axial bore 22 of a probe barrel 24. The forward free end of the barrel 22 is provided with external threads 26. Immediately adjacent the threads 26 are pair of annular grooves 28, 30 each receiving therein a respective O-Ring 32, 34. An annular end member 36 has an axial bore 38 which receives therein the free end of the optical cable 12 and the retaining ring 18. End member 36 is provided with side annular grooves 40, 42 each receiving a respective O-Ring 44, 46. A circular groove 48 formed in face 50 receives another O-Ring 52 therein. A disk shaped window 54 is received against the face 50. An elongated cylindrical seal member 56 holds the window 54 in place by engaging the window with an annular flange 58 at one end of seal member 56. Internal threads 60 towards the opposite end of seal member 56 engage the threads 26 of the probe barrel 24. The seal member 56 extends beyond the threads 60 to provide a cylindrical surface which tightly engages against the O-Rings 32, 34 thus providing a fluid tight seal at the forward end of the inner fiber mounting assembly 14.

The rear end of the probe barrel 24 has an annular enlargement 62 forming a rearwardly directed shoulder 64. It then necks down to a cylindrical portion 66 of lesser diameter than the remainder of the probe barrel 24. This portion 66 is internally threaded at 68. An end plug 70 is provided with external threads 72 and engages the threads 68 in the portion 66.

The outer probe housing 16 has an elongated cylindrical body sleeve 74 having external threads 76 on the forward end and internal threads 78 preferably extending the entire length thereof. A housing body 80 is received on the forward end of the body sleeve 74 by internal threads 82 which engage threads 76. The opposite or free end of the housing body 80 has been shown necked down and provided with outwardly directed threads 84. An axial bore 86 of the housing body 80 contains a pair of parallel grooves 88 and 90 each receiving therein an O-Ring 92, 94. These O-Rings 92, 94 make a sealing engagement with the probe barrel 24. An adjustment nut 96 is received in the opposite end of the body sleeve 74 with external threads 98 engaging with the threads 78. The adjustment nut also includes a profiled outer portion 100 to facilitate turning the nut. An oil sleeve 102 is fitted between the portion 66 of the probe barrel and the adjustment nut 96.

In operation the fiber optic cable 12 is placed in the probe retaining rod 20 which is then inserted into the probe barrel 24 and secured in place by the end plug 70. The end member 36, sapphire window 54, and seal member 36 are placed on the end of the probe barrel 24 which is then inserted into the body sleeve 74 and secured in place by the housing body 80 and the adjustment nut 96. It is the adjustment nut which controls the distance that the probe penetrates into the pressure vessel 104. When the device is fully assembled it can then be inserted into the pressure vessel 104 by means of the threads 84 on the housing body 80.

The window 54 protects the fiber optic probe from chemical agents, pressure and abrasion. The window can be made from any material that will transmit the wavelengths desired for a particular application. Glass can be used when vessel pressures are relatively low, and visible or near-IR wavelengths are used for the analysis. Fused silica (quartz) windows would be appropriate for low to moderate pressures, and if the analysis wavelengths lie in the ultraviolet range (185–330 nm). Sapphire windows can also be used for ultraviolet, visible, and near-IR analyses when vessel pressures are very high (several thousand psi). Many other materials can be used for special conditions of wavelength, pressure, and/or chemical resistance. These materials might be diamond, zinc selenide, calcium fluoride, germanium, etc., as well as fluorocarbon polymers such as Dupont Teflon-AF. Because the window is sealed in the housing with O-rings, the design makes it possible to change windows from one material to another in the field.

The invention permits the fiber optic probe to be inserted into a pressurized vessel or pipe, without bleeding pressure from the vessel or interrupting fluid flow.

The invention allows the probe to be inserted to a range of depths in the vessel or pipe. This is helpful in a pipeline since it allows finding the optimum flow rate conditions for a particular analysis. Sometimes the probe must be inserted into the flow but other times it may be better that the probe does not improve upon the flow. This way lessens turbulance, thereby improving readings while preserving the cleanliness of the window thereby improving the integrity of the readings. Depth control in a vessel is helpful to determine the distribution of a fluid property (particle density, chemical distribution, completeness of mixing, etc.).

The invention's design also allows the fiber probe to be changed during an analysis. This is particularly useful in determining the most cost effective probe for a certain application. For example, the operator could test the performance of an inexpensive ⅛" glass fiber probe to see how it compared to an expensive ¼" probe made of synthetic silica.

The invention is useful in both high and low pressure vessels. Fiber optic bundles often leak between the fibers under only a few psi of pressure. The present invention provides a fluid tight environment around the optical cable thereby obviating the possibility of leaks. Also, as stated above, the invention protects the fibers from chemically aggressive environments, regardless of the vessel pressure.

There are two areas to consider regarding the pressure load. The first is the possible implosion of the probe itself. The critical area in which this might occur is the window of the probe. A material was needed that was both transparent and strong enough to withstand the expected pressure loads. A sapphire window was found to be satisfactory for many applications. The O-ring seals around the sapphire window allow it limited room to expand, when it heats up to the pipeline temperature, and reduces thermal stresses. The shell portion of the probe has a wall that is thick enough to resist the pressure. The end cap portion is unique in that it allows the fiber optics to be accurately located in the probe tip. Double O-rings are preferred for redundancy in case one fails.

The other area to consider is how to insert the probe into the vessel. A hydrostatic force equal to the cross sectional area of the probe times the pipeline pressure must be overcome to insert the probe. This creates stress in the housing body 80 and the body sleeve 74. Tools for inserting probes into low pressure vessels use a side mounted screw jack to drive the probe. An example of this is the Cosasco Model 60 by Rohrback Cosasco Systems Inc. of Santa Fe Springs, California. This is convenient because you do not have to thread any connecting wires or cables through the screw jack portion. The problem is that hydrostatic force is no longer acting axially down the center of the body sleeve, but creating a bending moment through the attached screw jack. This is acceptable at low pressures, but for high pressures a side screw jack would be very large and cumbersome.

The present tool was designed along the lines of an axial screw jack, so that the adjustment nut 96 is in the same axis as the hydrostatic force. Much effort was expended in overcoming the problems of having a cable in the same axis as the screw jack. That is why many of the pieces are slotted. The present invention provides for controlling the depth of penetration by the probe by having the entire length of the body sleeve 74 threaded for the adjustment nut 96.

The present invention may be subject to many modifications and changes without departing from the spirit or essential characteristics thereof. The present embodiment should therefore be considered in all respects as illustrative and not restrictive as to the scope of the invention as defined by the appended claims.

What is claimed is:

1. A device for inserting a probe into a pressure vessel to adjustable depths in order to measure characteristics of fluid contained within said vessel, said device comprising:

an outer mounting assembly of generally cylindrical configuration having
a body sleeve with internal threads running substantially the entire length thereof and exterior threads on at least a first end for mounting said device on said pressure vessel;
an inner probe securing assembly received coaxially within said outer mounting assembly and movable axially relative thereto; and
adjusting nut means engaging in said internal threads of said body sleeve and bearing against said inner probe securing assembly whereby the inner probe is axially adjusted relative to the body sleeve.

2. The device according to claim 1 wherein said probe is an optical probe.

3. The device according to claim 1 wherein said vessel is a pipe line.

4. The device according to claim 1 wherein said vessel is maintained at high pressures.

5. The device according to claim 1 further comprising:

annular seal means between said outer mounting assembly and said inner probe assembly providing effective sealing there between.

6. The device according to claim 5 wherein said seals are O-rings received in annular grooves in one of said assemblies and making wiping engagement with the other of said assemblies.

7. The device according to claim 1 further comprising:

a housing body threadedly received on the exterior threads of said body sleeve, said housing body having a profiled free end adapted to engage in an orifice in said pressure vessel to securely mount said device thereon.

8. The device according to claim 1 wherein said inner probe securing assembly comprises:

a probe retaining rod of sufficient rigidity to provide linear stability to an optical probe cable and is adapted to receive said optical probe cable axially therein.

9. The device according to claim 8 wherein said rod has a C-shaped section to facilitate insertion and removal of the probe cable.

10. The device according to claim 8 further comprising:

an elongated probe barrel having an axial bore, and outwardly projecting and rearwardly directed shoulder near a rear end, internal threads at said rear end, and external threads on the forward end; and said probe retaining rod has a transverse channel configuration received axially in said probe barrel.

11. The device according to claim 10 further comprising:

a first member received on the forward end of said probe barrel for securing and aligning a probe member therein.

12. The device according to claim 10 further comprising:

a seal member received on said first member in sealing relationship, said seal member having a generally cylindrical profile with an inwardly directed annular flange on one end thereof, and window means sealingly received against said flange.

13. The device according to claim 12 wherein said window means is a sapphire disc.

14. The device according to claim 12 wherein said window means is selected from the group including diamond, zinc selenide, calcium fluoride, germanium, and fluorocarbon polymers.

15. The device according to claim 12 wherein visible or near IR wavelengths are used and said window means is glass.

16. The device according to claim 12 wherein the analysis wavelengths lie in the ultraviolet range and the window means is fused silica.

17. The device according to claim 12 wherein the vessel pressures are in the range of several thousand psi, ultraviolet, visible and near-IR analysis is used, and the window means is sapphire.

* * * * *